United States Patent
Montoya

(10) Patent No.: US 9,511,716 B2
(45) Date of Patent: Dec. 6, 2016

(54) VEHICLE SIDE BAR END CAP

(71) Applicant: IDDEA CALIFORNIA, LLC, Brea, CA (US)

(72) Inventor: Alberto Montoya, Zapopan (MX)

(73) Assignee: Iddea California, LLC, Brea, CA (US)

(*) Notice: Subject to any disclaimer, the term of this patent is extended or adjusted under 35 U.S.C. 154(b) by 0 days.

(21) Appl. No.: 14/874,017

(22) Filed: Oct. 2, 2015

(65) Prior Publication Data

US 2016/0059786 A1 Mar. 3, 2016

Related U.S. Application Data

(63) Continuation of application No. 14/475,202, filed on Sep. 2, 2014, now abandoned.

(51) Int. Cl.
*B60R 3/00* (2006.01)
*B60R 9/02* (2006.01)

(52) U.S. Cl.
CPC *B60R 3/002* (2013.01); *B60R 9/02* (2013.01)

(58) Field of Classification Search
CPC .............. B60R 3/00; B60R 3/02; B60R 3/002; B60R 3/04; B60R 9/02
See application file for complete search history.

(56) References Cited

U.S. PATENT DOCUMENTS

| | | |
|---|---|---|
| 3,095,644 A | 7/1963 | Curry |
| 3,727,295 A | 4/1973 | Gildemeister |
| 4,103,412 A * | 8/1978 | Krieger .................. A63B 59/50 29/460 |
| 4,852,423 A | 8/1989 | Mikami et al. |
| 4,854,548 A | 8/1989 | Wylie |
| 5,144,780 A | 9/1992 | Gieling et al. |
| 5,193,829 A | 3/1993 | Holloway et al. |
| 6,112,618 A * | 9/2000 | Yates ..................... B62K 21/26 16/DIG. 12 |
| D568,222 S | 5/2008 | Storer |
| 7,731,212 B2 | 6/2010 | Storer |
| 7,931,544 B2 | 4/2011 | Gill |
| D671,874 S | 12/2012 | Kekich, Jr. et al. |
| 8,448,967 B2 | 5/2013 | Storer |
| 2005/0087950 A1 | 4/2005 | Draper et al. |
| 2005/0263975 A1 | 12/2005 | Mulder et al. |
| 2012/0104718 A1 | 5/2012 | Alvarez et al. |

\* cited by examiner

*Primary Examiner* — Frank Vanaman
(74) *Attorney, Agent, or Firm* — Stetina Brunda Garred and Brucker

(57) ABSTRACT

A vehicle side bar end cap assembly comprised of an end cap having an annular skirt, an adapter having an engagement sleeve and mounting body, and a tubular rail having at least one open end. The end cap is configured to correspond and removably attach to a mounting surface located on the mounting body of the adapter. The engagement sleeve is configured to removably, frictionally, and circumferentially engage the tubular rail. The mounting body includes an annular flange having a first surface for engaging the open end of the tubular rail, an opposing second surface for engaging the annular skirt, and an external edge. The external surface of the tubular rail, the external annular flange edge, and the external surface of the end cap define a flush connection surface about the open end of the tubular rail after complete installation of the end cap assembly.

20 Claims, 4 Drawing Sheets

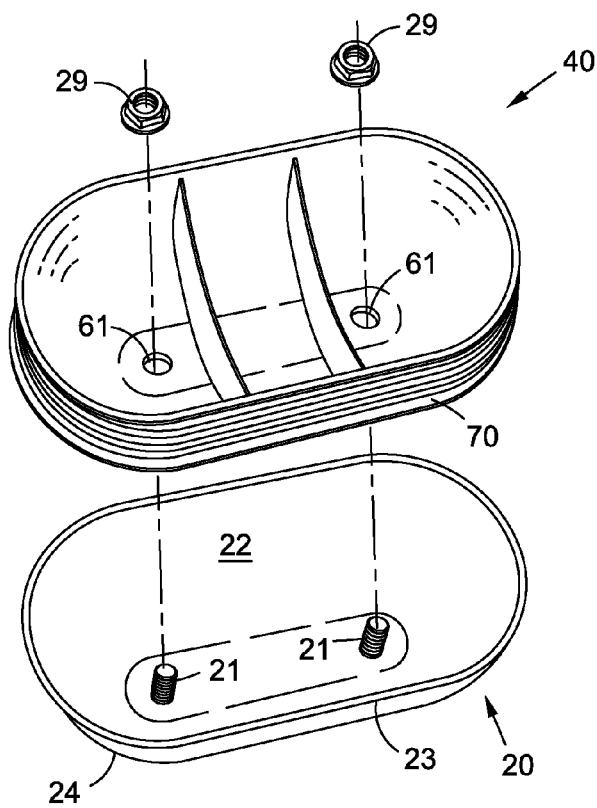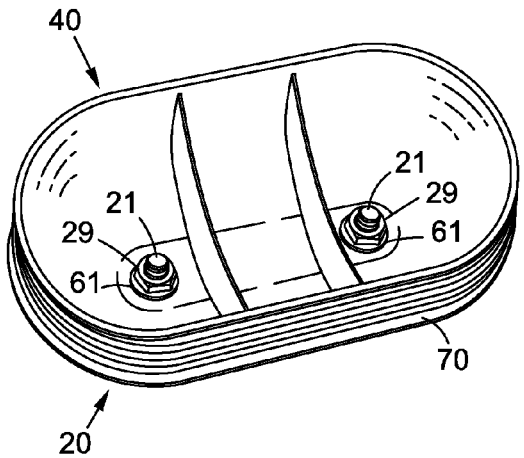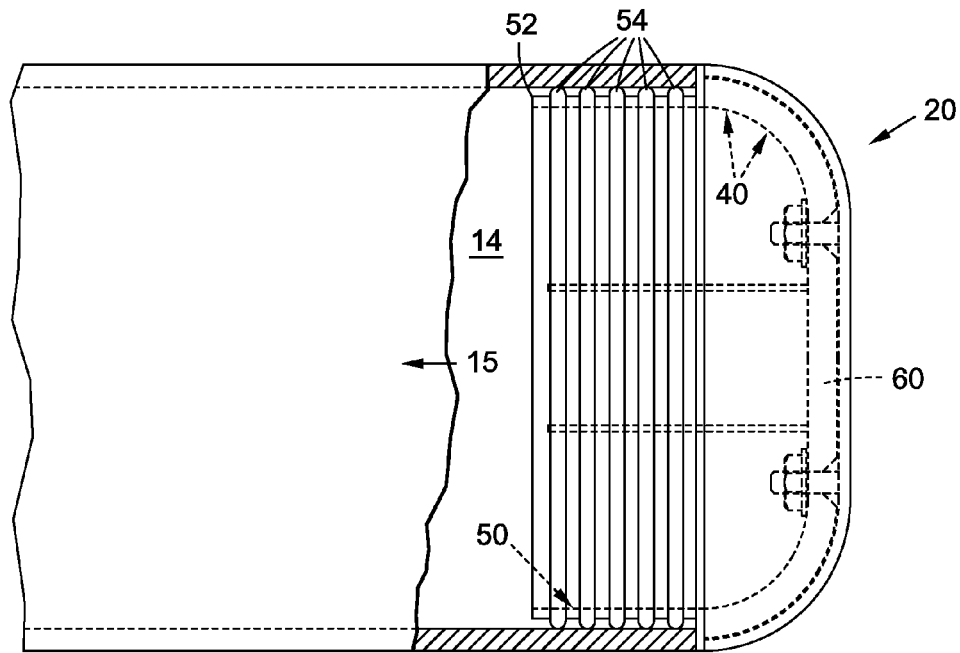

VEHICLE SIDE BAR END CAP

CROSS-REFERENCE TO RELATED APPLICATIONS

The present application is a continuation patent application of U.S. patent application Ser. No. 14/475,202 filed on Sep. 2, 2014, the entire contents of which are incorporated herein by reference.

STATEMENT RE: FEDERALLY SPONSORED RESEARCH/DEVELOPMENT

Not Applicable

BACKGROUND

1. Technical Field of the Invention

The present invention relates generally to a vehicle accessory and more specifically to a removable end cap assembly for a vehicle side bar and its method of installation.

2. Description of the Related Art

A side bar is a common accessory on a number of vehicles, such as pick-up trucks, sports utility vehicles, large utility trucks or jeeps. The side bar is multi-purpose in that it can be used for appearance and/or protection of the vehicle. For example, a side bar may provide protection to both the door and side of the vehicle. Specifically, certain vehicles are commonly used for off-road activities, which often involve maneuvering through all types of conditions including dirt, uneven terrain, mud, bodies of snow and ice. Driving through these conditions may cause debris, such as dirt, rocks and other particles to be projected onto the vehicle causing dents, nicks and other similar damage to the vehicle and paint. A side bar may deflect the various types of debris before contact is made with the vehicle. Moreover, a side bar may be attached to the side of a vehicle for appearance purposes. Many vehicle owners choose to install an externally mounted side bar to enhance the appearances of the vehicle. In particular, owners who display their vehicles at shows or use the vehicle for activities such as racing often add a side bar to impart a certain character to the vehicle.

Side bars are generally constructed from a strong and durable material, such as steel, titanium, and aluminum, and are often fabricated to be hollow, tubular rails, with two open ends, to be light-weight and maintain the performance of the vehicle. Therefore, side bars are generally constructed as a singular, open-ended rail, and require the vehicle owner to install two end caps to close off the open end of the side bar. Many vehicle owners choose to permanently weld the end caps to the open ends of the side bar. In this fashion, vehicle owners purchase or fabricate end caps constructed from the same material as the side bar, and weld the end cap onto the open end. After welding the end cap onto the open end of the rail, the side bar appears to be a one-piece, close-ended rail constructed from a single material.

Welding the end cap to the open end of a side bar, however, makes replacing a damaged end cap extremely difficult and cumbersome. Vehicles with side bars are commonly used for off-road activities, and thus are more susceptible to be damaged by rocks, dirt, ice, and other types of debris. Therefore, side-bars and their corresponding end caps are highly vulnerable to being damaged because they are located near the ground and in alignment with the vehicle's tires. As such, end caps are likely to be damaged when off-road driving or driving over uneven terrain. When a welded-on end cap gets damages, a vehicle owner is limited to either purchasing a new side bar and reinstalling new end caps, or cutting off the damaged end cap and re-welding a new one. Unless the vehicle owner executes one of these options, the damaged welded-on end cap will remain in place and diminish the appearance of both the side bar and the vehicle. Therefore, although welded-on end caps achieve the one-piece, close-ended appearance desired by many vehicle owners, welded-on end caps also require significant effort and expense to replace and reinstall the end caps after they are damaged.

Instead of welded-on end caps constructed from the same material as the side bar, many vehicle owners choose to purchase plastic end caps that fasten to the side bar. Plastic end caps can be replaced more easily than welded-on end caps because they are commonly fixed to the end cap using screws, nuts and bolts, or other types of removable fastener assemblies. In this way, if a plastic end cap gets damaged, a vehicle owner can detach the end cap from the side bar by unscrewing a threaded fastener, or a plurality of threaded fasteners, and re-install a new end cap, instead of replacing the entire side bar, or cutting off a damaged, welded-on end cap and re-welding a new end cap. Although plastic end caps may be more easily removed compared to welded-on end caps, plastic end caps have an installation process that requires the vehicle owner or mechanic to exert a significant amount of manual dexterity, and may require more than one person to complete. Additionally, plastic end caps do not achieve the one-piece, close-ended appearance desired by many vehicle owners. Even if a plastic-end cap is coated with a chrome finish, or other type of non-corrosive finish, a metallic side bar with the same coated finish may have a different appearance than the plastic end cap due to the texture of the external surface of the plastic end cap. Moreover, the plastic end cap may not have the desired strength and durability necessary for repeated off-road driving, therefore the vehicle owner may need to purchase replacement end caps more often. Also, plastic end caps may not protect the interior of the side rail because they are locally fixed to the side bar using screws and may not seal the outer perimeter of the open end of the side bar.

A need exists for an end cap assembly for a vehicle side bar that is strong, durable, easy to install, and able to achieve the one-piece, close-ended appearance that many vehicle owners desire when purchasing a side bar. The end cap assembly should have a simple construction that makes removing and installing the end cap assembly a single step process. The end cap assembly should be able to be constructed from the same material as the side bar, and further able to be installed without welding. In addition, the end cap assembly should seal the open end of the side bar to protect the longevity and durability of the side bar.

BRIEF SUMMARY

An end cap assembly for a vehicle side bar is disclosed that comprises an end cap having an internal surface, an external surface, and an annular skirt; an adapter having an engagement sleeve and a mounting body; and a tubular rail having an internal surface, an external surface, and at least one open end. The end cap internal surface is configured to correspond and removably attach to a mounting surface disposed on the adapter mounting body. The engagement sleeve is configured to removably, frictionally, and circumferentially engage with the tubular rail internal surface. The mounting body includes an annular flange having a first surface for engaging the open end of the tubular rail, an opposing second surface for engaging the annular skirt, and an external edge that has a circumference substantially equal to the outer circumferences of the end cap and the annular skirt. The tubular rail external surface, the external annular flange edge, and the end cap external surface define a flush connection surface about the open end of the side bar upon complete installation of the end cap assembly.

More specifically, the end cap assembly comprises a tubular rail having a main body and at least one open end. The main body has a main body internal surface and a main body external surface, and the at least one open end has an open end inner circumference and an open end outer circumference, wherein the main body internal and external surfaces define the open end inner and outer circumferences. Moreover, the main body internal surface defines a hollow portion extending in an axial direction. The end cap assembly further comprises an adapter having an engagement sleeve, wherein the engagement sleeve is configured to extend in a coaxial direction with the tubular rail and removably, frictionally, and circumferentially engage the tubular rail. The adapter also has a mounting body, wherein the mounting body has a mounting surface, at least one mounting body aperture disposed in the mounting surface, and a radially extending annular flange positioned between the engagement sleeve and the mounting surface. The annular flange has a first annular flange surface, an opposing second annular flange surface, and an external annular flange edge. The external annular flange edge includes an annular flange outer circumference defined by the first and second annular flange surfaces, wherein the annular flange outer circumference is substantially equal to the open end outer circumference. Additionally, the first annular flange surface is configured to engage the open end of the tubular rail. Moreover, the end cap assembly includes an end cap having an end cap internal surface, an end cap external surface, and an annular skirt, wherein the annular skirt has an annular skirt outer circumference defined by the end cap external surface. The end cap internal surface is configured to concentrically mate with the mounting surface of the adapter, the annular skirt outer circumference is substantially equal to the open end outer circumference and the annular flange outer circumference, and the annular skirt is configured to engage the second annular flange surface.

The tubular rail may be constructed from one of galvanized steel, black steel, aluminum, and titanium, and the main body external surface may be chrome finished.

Similarly, the end cap may be constructed from one of galvanized steel, black steel, aluminum, titanium, and plastic, and the end cap external surface may be chrome finished. The adapter may be constructed from one of an elastomeric material and a polymeric material. Also, the adapter and end cap may be fabricated by a die stamp process.

The engagement sleeve may have an engagement sleeve external surface comprised of a plurality of radially outward protruding annular ribs providing for removable, frictional, and circumferential engagement with the main body internal surface. Furthermore, the radially outward protruding annular ribs may protrude at an angle towards the first annular flange surface.

The main body external surface, the external annular flange edge, and the end cap external surface may define a flush external connection surface about the open end of the tubular rail when the engagement sleeve frictionally and circumferentially engages the main body internal surface, the first annular flange surface engages the open end of the tubular rail, and the annular skirt engages the second annular flange surface.

At least one fastener corresponding to the at least one mounting body aperture may be welded to the end cap internal surface for removable attachment of the end cap to the adapter about the mounting surface.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 represents an exploded view illustrating the manner of engagement between the end cap and the adapter.

FIG. 5 represents a bottom view illustrating the manner of engagement between the end cap and the adapter.

FIG. 6 represents the manner of engagement between the adapter and the main body internal surface.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

Figure 1:
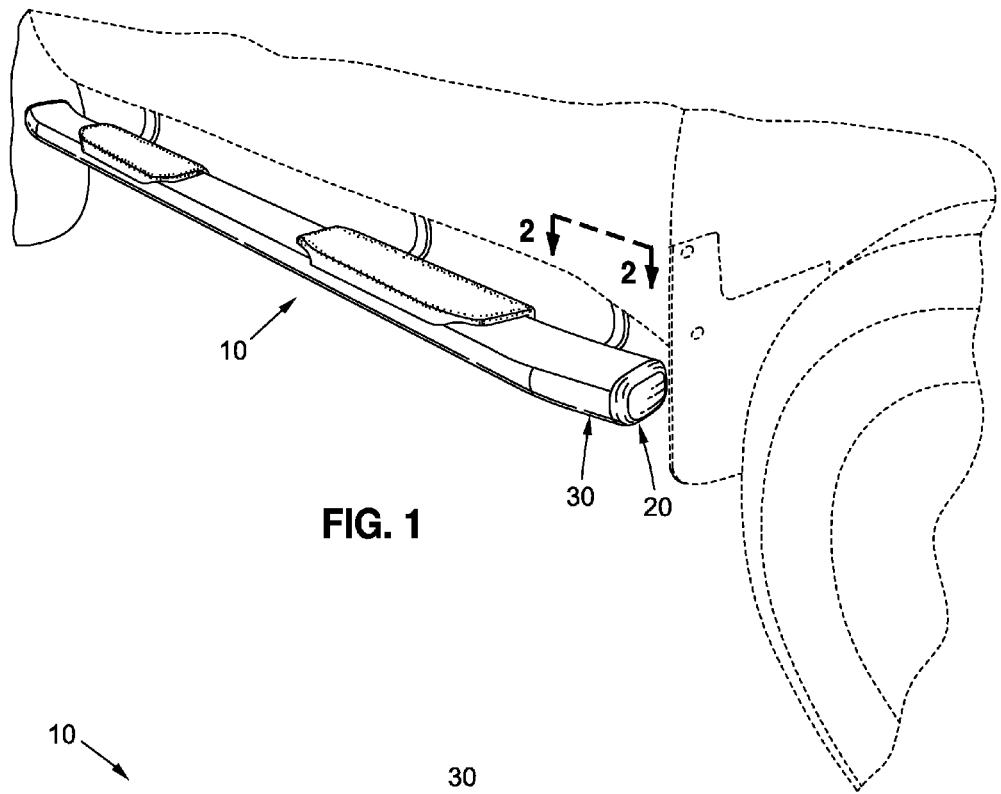
FIG. 1 represents a side view of a typical installation of an exemplary embodiment of a side bar end cap assembly.

FIG. 1 represents a side view of a typical installation of an exemplary embodiment of a side bar end cap assembly 2 illustrated generally to include a tubular vehicle side bar 10 and an end cap 20 affixed to an open end 30 of the side bar 10. The end cap 20 may be removably connectable to the open end 30 of the side bar 10 by means of an adapter 40 (not shown). The adapter 40 may be removably attached to the end cap 20. When coupled together, the adapter 40 and the end cap 20 may be configured to removably engage the side bar 10 and seal the open end 30, such that the side bar 10 appears to be a one-piece, close-ended rail when installation of the end cap assembly 2 is complete.

In FIG. 1, the vehicle side bar 10 is represented as being generally cylindrical in shape, and the end cap 20 is represented as being generally hemispherical in shape to correspond with the shape of the side bar 10 and the open end 30. It should be apparent to one skilled in the art that the vehicle side bar 10 and the end cap 20 represented in FIG. 1 are merely exemplary and the teachings herein are equally applicable to other geometric shapes of vehicle side bars 10 and corresponding end caps 20. Moreover, although only one side bar end cap assembly 2 is represented in FIG. 1, it should be apparent to one skilled in the art that vehicle side bars are customarily designed to be hollow and light weight so that the side bar will not impede the performance of the vehicle. Thus, vehicle side bars customarily have two open ends and require two corresponding end caps. Exemplary vehicle side bars may be of the type described in Storer, "Vehicle Side Step," U.S. Pat. No. 8,448,967, May 28, 2013; Storer, "Vehicle Side Step," U.S. Pat. No. 7,731,212 B2, Jun. 8, 2010; Storer, "Vehicle Side Bar," U.S. Pat. D568,222 S, May 6, 2008; and Kekich, Jr. et al, "Vehicular Side Bar," U.S. Pat. D671,874 S, Dec. 4, 2012.

Figure 2:
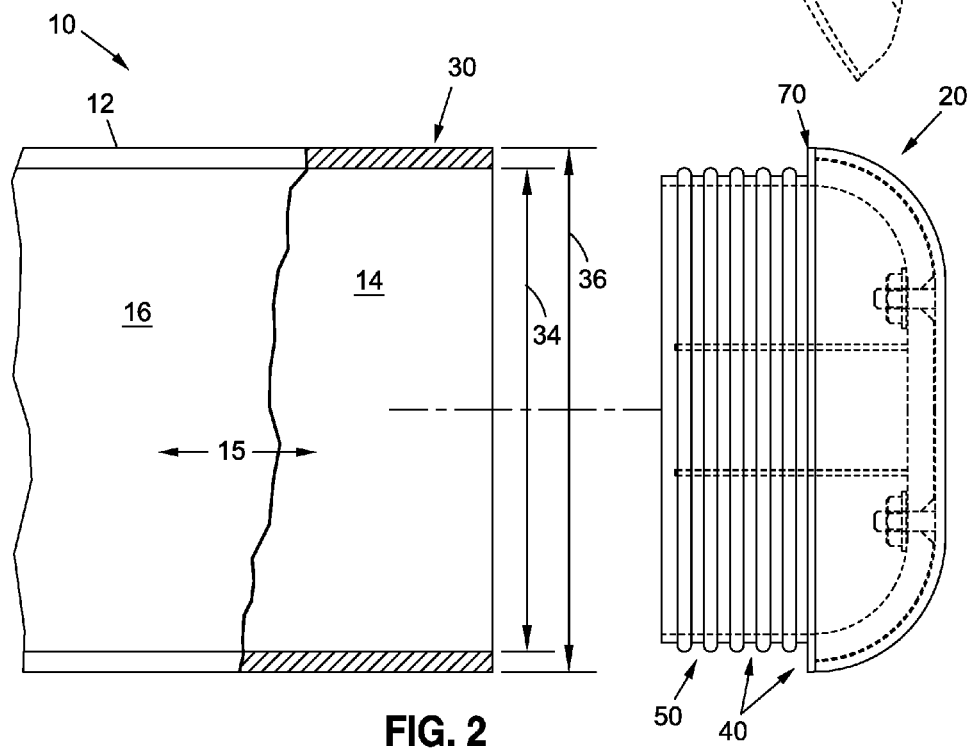
FIG. 2 represents an internal side view of the end cap assembly prior to installation.

FIG. 2 represents an internal side view of the end cap assembly 2 prior to installation for illustrating the manner of engagement between the various components of the completed end cap assembly 2. The side bar 10 has a main body 12 and an open end 30. The main body 12 has an internal surface 14 and an external surface 16. The internal surface 14 of the main body 12 defines a hollow portion 15 extending throughout the center of the main body 12 in an axial direction. The internal and external surfaces 14, 16 of the main body respectively define an inner circumference 34 of the open end 30 and an outer circumference 36 of the open end 30.

An adapter 40 may be attached to the end cap 20 by means of a mounting body 60, and frictionally engage the internal surface 14 of the main body 12 by means of an engagement sleeve 50. The engagement sleeve 50 may be configured to frictionally engage the internal surface 14 of the main body 12, and the mounting body 60 may be configured to mate with the end cap 20 and attach the adapter 40 to the end cap 20. Moreover, the mounting body 60 has an annular flange 70 for engaging the open end 30 of the side bar, and for providing a seating surface for the end cap 20. The manner of engagement between the end cap 20 and the adapter 40, the adapter 40 and the main body internal surface 14, and the adapter 40 and the open end 30 of the side bar 10, will be discussed in more detail below.

Figure 3:
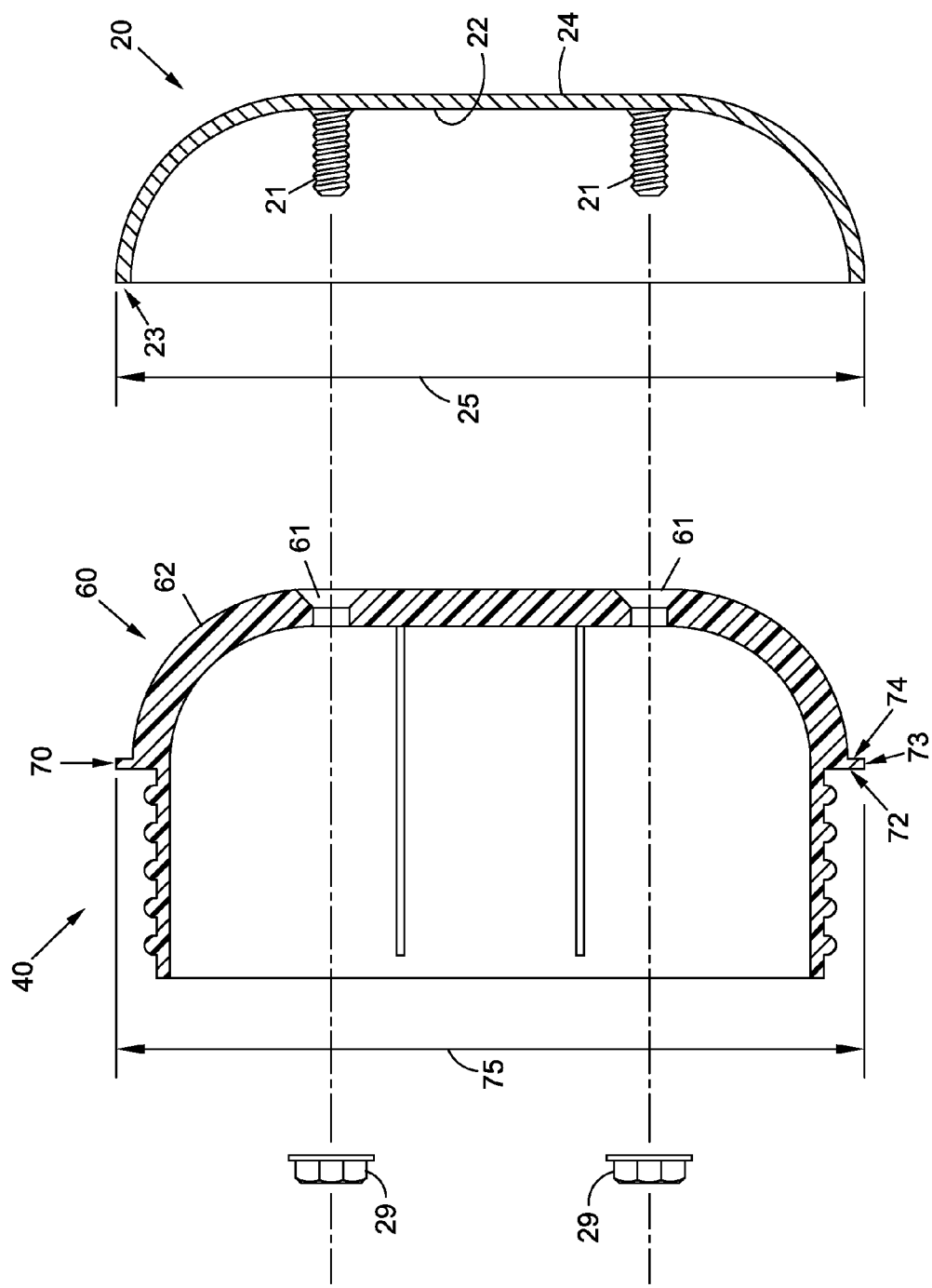
FIG. 3 represents a side view illustrating the manner of engagement between the end cap and the adapter.

In FIGS. 3-5, respectively, there is a side view, an exploded view, and a bottom view illustrating the manner of engagement between the end cap 20 and the adapter 40. The end cap 20 has an internal surface 22 and an external surface 24. The end cap internal surface 22 and the end cap external surface 24 define an annular skirt 23, wherein the annular skirt 23 has an outer circumference 25 defined by the end cap external surface 24. The adapter 40 includes a mounting body 60 for removably engaging the end cap internal surface 22. More particularly, the mounting body 60 includes a mounting surface 62 shaped to concentrically mate with the end cap internal surface 22. Preferably, the mounting surface 62 includes two apertures 61, and the end cap internal surface 22 includes two corresponding, axially-extending fasteners 21 for removably attaching the adapter 40 to the end cap 20. It is contemplated that the fasteners 21 may be threaded to correspond with a threaded nut 29, and also may be tack-welded or spin-welded to the end cap internal surface 22. Although only two apertures 61 and two corresponding fasteners 21 are shown in FIGS. 3-5, any number of corresponding apertures and fasteners may be utilized to securely attach the end cap 20 to the mounting body 60. Additionally, it should be apparent to one skilled in the art that other processes for fixing the fasteners 21 to the end cap internal surface 22 may be used instead of using a welding process. Although the fasteners 21 and nuts 29 are shown as being threaded in FIGS. 3-5, any nut-and-bolt combination may be used to secure the mounting body 60 to the end cap internal surface 22.

The mounting body 60 further includes an annular flange 70 comprising a first annular flange surface 72 and an opposing second annular flange surface 74. The first annular flange surface 72 and the opposing second annular flange surface 74 define an external annular flange edge 73 having an outer circumference 75. To accomplish the desired one-piece, close-ended appearance of the completed end cap assembly 2, the outer circumference 75 may be configured to substantially equal the annular skirt outer circumference 25. In this fashion, once the annular skirt 23 engages the second annular flange surface 74, the end cap external surface 24 may be in flush alignment with the external annular flange edge 73 about the annular skirt 23 and annular flange 70 interface.

FIG. 6 represents the manner of engagement between the adapter 40 and the main body internal surface 14. In addition to the mounting body 60, the adapter 40 further includes an engagement sleeve 50 that extends in a coaxial direction with the hollow portion 15. The engagement sleeve 50 may be configured to removably, circumferentially, and frictionally engage the main body internal surface 14. Preferably, the engagement sleeve 50 has an external surface 52 comprised of a plurality of radially outward protruding annular ribs 54 providing for frictional and circumferential engagement with the main body internal surface 14. In this fashion, after the end cap 20 is attached to the adapter mounting body 60, the user can install the end cap onto the open end 20 of the side bar by pushing the end cap such that the engagement sleeve 50 inserts into the hollow portion 15 and the plurality of radially outward protruding ribs 54 frictionally engage the main body internal surface 14. As shown in FIG. 6, the annular ribs protrude outward at a 90-degree angle from the engagement sleeve external surface. Thus, the annular ribs 54 engage the main body internal surface 14 in a perpendicular fashion, wherein the engagement sleeve external surface 52 and the main body internal surface 14 are parallel to each other, and the annular ribs 54 extend in an orthogonal direction from the engagement sleeve external surface 52 to frictionally engage with the main body internal surface 14.

Figure 7:
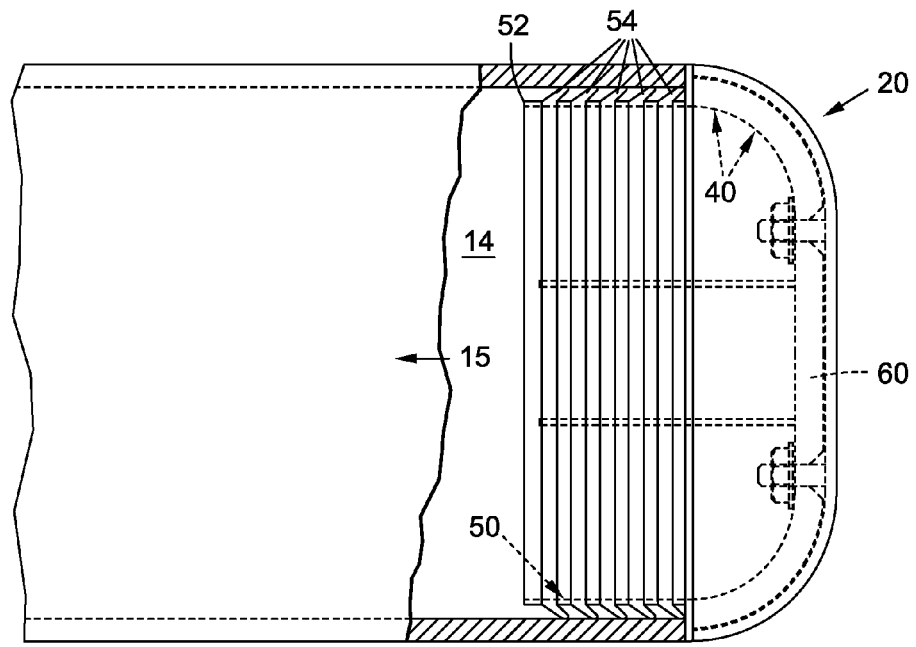
FIG. 7 represents an embodiment of the end cap assembly wherein the plurality of radially outward protruding annular ribs is configured to protrude at an angle.

Alternatively, as shown in FIG. 7, the plurality of radially outward protruding annular ribs 54 may be configured to protrude at an angle. More particularly, the annular ribs 54 may be configured to extend at an angle towards the first annular flange surface 72, instead of extending orthogonal to the main body internal surface 14. The configuration of the angled annular ribs 54 requires less force to be exerted by the user when inserting the engagement sleeve 50 into the hollow portion 15 of the side bar 10 because the angled annular ribs 54 can slide along the main body internal surface 14 with less friction as the user pushes the coupled end cap 20 and adapter 40 into position. Therefore, the angled annular ribs 54 provide for a more accessible installation of the end cap assembly 2. After the end cap assembly is completely installed, more force is required to remove the engagement sleeve 50 from the main body internal surface 14 because the angled annular ribs 54 push outward against the main body internal surface 14 as the user pulls the coupled end cap 20 and adapter 40 out from the hollow portion 15 and away from the open end 30 of the side bar 10. Thus, if the user is off-road driving, or driving in extreme conditions, the end cap 20 will not easily become loose or inadvertently discharge in response to clashing with rocks, dirt, or other types of potentially dangerous debris. Although the angled configuration of the annular ribs 54 requires more force to remove the coupled end cap 20 and adapter 40, the user only needs to exert a moderate amount of force to a remove and replace a damaged end cap. Additionally, because the angled annular ribs 54 extend outward and an angle toward the first annular flange surface, the ribs effectively form a plug for the hollow portion 15 of the side bar, and may block any debris or water from entering the hollow portion and damaging the main body internal surface 14.

Therefore, the angled annular ribs 54 may be configured to provide a water-tight seal for the end cap assembly 2, thus protecting the integrity and longevity of the main body 12 of the side bar 10.

Figure 8:
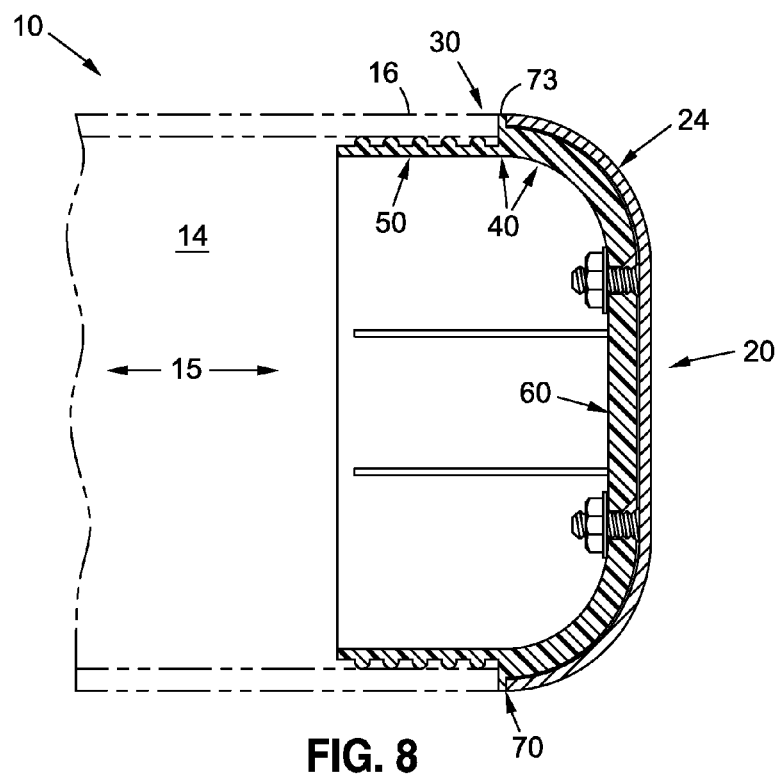
FIG. 8 represents the manner of engagement between the adapter and the open end of the side bar.

FIG. 8 shows the manner of engagement between the adapter 40 and the open end 30 of the side bar 10. In general, the annular flange 70 of the mounting body 60 abuts the open end 30 of the side bar 10, thus providing interface, or spacer, between the open end 30 and the end cap annular skirt 23. More particularly, the first annular flange surface 72 may be configured to engage the open end 30 of the side bar 10 after the engagement sleeve 50 is completely inserted into the hollow portion 15 of the side bar. Similar to the manner of engagement between the end cap 20 and the adapter 40, the outer circumference 75 of the annular flange external edge 73 may be configured to substantially equal the outer circumference 36 of the open end 30 (see FIGS. 2 and 3). In this fashion, once the first annular flange surface 72 engages the open end 30, the annular flange external edge 73 may be positioned in flush alignment with the main body external surface 16 the annular flange 70 and open end 30 interface. With complete installation of the end cap assembly 2, the main body external surface 16, the annular flange external edge 73, and the end cap external surface 24 may define a flush external connection surface about the open end 30 of the side bar 10 such that the side bar 10 appears to be a one-piece, close-ended rail.

Preferably the side bar 10 is constructed from an appropriately strong and durable material, including without limitation aluminum, galvanized steel, black steel, and titanium. Additionally the material selected for construction of the main body 12 should be resistant to weather, corrosion, and other types of wear commonly associated with use, such as bending due to the application of weight on or against the end cap assembly 2. It is contemplated that chrome may be used to coat or finish the main body external surface 12 to prevent corrosion and to give the side bar an aesthetically pleasing appearance.

To achieve the one-piece, close-ended appearance of the side bar 10, the end cap 20 may be constructed from the same material as the side bar, wherein the end cap is constructed from a formed metal material that is strong and durable, including without limitation aluminum, galvanized steel, black steel, titanium, and plastic. Chrome may also be used to coat or finish the end cap external surface 24 to resist corrosion and give the end cap the same external appearance as the side bar.

Preferably, the adapter 40, which comprises the engagement sleeve, mounting body, and plurality of radially outward protruding ribs, is constructed from an appropriately flexible and durable material, including without limitation elastomeric and polymeric materials. Using an appropriately flexible yet firm and durable material, allows the adapter to securely engage the internal surface of the main body, while also allowing the user to remove and replace a damaged end cap from the hollow portion 15.

It is further contemplated that the adapter 40 and the end cap 20 may be fabricated utilizing a die stamping process in order to achieve the desired shape and size of the end cap assembly.

The above description is given by way of example, and not limitation. Given the above disclosure, one skilled in the art could device variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An end cap assembly comprising:
   a tubular rail having a main body and at least one open end, the main body having a main body internal surface and a main body external surface, and the at least one open end having an open end inner circumference and an open end outer circumference, wherein the main body internal and external surfaces define the open end inner and outer circumferences, and the main body internal surface defines a hollow portion extending in an axial direction;
   an adapter having:
      an engagement sleeve;
      the engagement sleeve being configured to extend in a coaxial direction with the tubular rail and configured to removably, frictionally, and circumferentially engage the tubular rail; and
      a mounting body; the mounting body having a mounting surface, at least one mounting body aperture disposed in the mounting surface offset from a longitudinal axis of the mounting body, and a radially extending annular flange positioned between the engagement sleeve and the mounting surface, wherein the annular flange has a first annular flange surface, an opposing second annular flange surface, and an external annular flange edge, the external annular flange edge having an annular flange outer circumference defined by the first and second annular flange surfaces;
      the annular flange outer circumference being substantially equal to the open end outer circumference; and
      the first annular flange surface being configured to engage the open end of the tubular rail; and
   an end cap having an end cap internal surface, an end cap external surface, and an annular skirt, wherein the annular skirt has an annular skirt outer circumference defined by the end cap external surface;
   the end cap internal surface conforming to and abutting the mounting surface of the adapter;
   the annular skirt outer circumference being substantially equal to the open end outer circumference and the annular flange outer circumference; and
   the annular skirt engaging the second annular flange surface.

2. The end cap assembly recited in claim 1, wherein the tubular rail is constructed from one of galvanized steel, black steel, aluminum, and titanium.

3. The end cap assembly recited in claim 2, wherein the main body external surface is chrome finished.

4. The end cap assembly recited in claim 1, wherein the end cap is constructed from one of galvanized steel, black steel, aluminum, titanium, and plastic.

5. The end cap assembly recited in claim 4, wherein the end cap external surface is chrome finished.

6. The end cap assembly recited in claim 1, wherein the adapter is constructed from one of an elastomeric material and a polymeric material.

7. The end cap assembly recited in claim 1, wherein the adapter and end cap are fabricated by a die stamp process.

8. The end cap assembly recited in claim 1, wherein the engagement sleeve has an engagement sleeve external surface comprised of a plurality of radially outward protruding annular ribs providing for removable, frictional, and circumferential engagement with the main body internal surface.

9. The end cap assembly recited in claim 8, wherein the radially outward protruding annular ribs protrude at an angle towards the first annular flange surface.

10. The end cap assembly recited in claim 8, wherein the main body external surface, the external annular flange edge, and the end cap external surface define a flush external connection surface about the open end of the tubular rail when the engagement sleeve frictionally and circumferentially engages the main body internal surface, the first annular flange surface engages the open end of the tubular rail, and the annular skirt engages the second annular flange surface.

11. The end cap assembly recited in claim 1, wherein at least one fastener corresponding to the at least one mounting body aperture is welded to the end cap internal surface for removable attachment of the end cap to the adapter about the mounting surface.

12. An end cap assembly for removably sealing an open end of a tubular rail having internal and external surfaces defining respective inner and outer circumferences of the open end of the tubular rail, the end cap assembly comprising:
   an adapter having:
      an engagement sleeve;
      the engagement sleeve being configured to extend in a coaxial direction with the tubular rail and configured to removably, frictionally, and circumferentially engage the tubular rail; and
      a mounting body;
      the mounting body having a mounting surface, a mounting body aperture disposed in the mounting surface, and a radially extending annular flange positioned between the engagement sleeve and the mounting surface, wherein the annular flange has a first annular flange surface, an opposing second annular flange surface, and an external annular flange edge, the external annular flange edge having an annular flange outer circumference defined by the first and second annular flange surfaces;
      the annular flange outer circumference being substantially equal to the outer circumference of the open end of the tubular rail; and
      the first annular flange surface being configured to engage the open end of the tubular rail; and
   an end cap having an end cap internal surface, an end cap external surface, a fastener, attached to and extending from the end cap internal surface, and an annular skirt, wherein the annular skirt has an annular skirt outer circumference defined by the end cap external surface;
   the end cap internal surface conforming to and abutting with the mounting surface of the adapter;
   the fastener corresponds to the mounting body aperture, and extends through the entire length of the mounting body aperture;
   the annular skirt outer circumference being substantially equal to the outer circumference of the open and of the tubular rail and the annular flange outer circumference; and
   the annular skirt engaging the second annular flange surface.

13. The end cap assembly recited in claim 12, wherein the end cap is constructed from one of galvanized steel, black steel, aluminum, titanium, and plastic.

14. The end cap assembly recited in claim 13, wherein the end cap external surface is chrome finished.

15. The end cap assembly recited in claim 12, wherein the adapter is constructed from one of an elastomeric material and a polymeric material.

16. The end cap assembly recited in claim 12, wherein the adapter and end cap are fabricated by a die stamp process.

17. The end cap assembly recited in claim 12, wherein the engagement sleeve has an engagement sleeve external surface comprised of a plurality of radially outward protruding annular ribs providing for removable, frictional, and circumferential engagement with the internal surface of the tubular rail.

18. The end cap assembly recited in claim 17, wherein the radially outward protruding annular ribs protrude at an angle towards the first annular flange surface.

19. The end cap assembly recited in claim 17, wherein the external surface of the tubular rail, the external annular flange edge, and the end cap external surface define a flush external connection surface about the open end of the tubular rail when the engagement sleeve frictionally and circumferentially engages the internal surface of the tubular rail, the first annular flange surface engages the open end of the tubular rail, and the annular skirt engages the second annular flange surface.

20. The end cap assembly recited in claim 12, further comprising a second fastener and a corresponding second mounting body aperture.

* * * * *